US009224133B2

(12) United States Patent
Rehmann et al.

(10) Patent No.: US 9,224,133 B2
(45) Date of Patent: Dec. 29, 2015

(54) METHOD FOR ESTABLISHING INTERPERSONAL COMMUNICATION AND SYSTEM

(75) Inventors: Mark L. Rehmann, Georgetown, TX (US); Philip M. Seibert, Round Rock, TX (US); Mark W. Welker, Westlake Hills, TX (US)

(73) Assignee: Dell Products, LP, Round Rock, TX (US)

( * ) Notice: Subject to any disclaimer, the term of this patent is extended or adjusted under 35 U.S.C. 154(b) by 386 days.

(21) Appl. No.: 13/069,826

(22) Filed: Mar. 23, 2011

(65) Prior Publication Data

US 2012/0246239 A1    Sep. 27, 2012

(51) Int. Cl.
| | |
|---|---|
| *G06F 15/16* | (2006.01) |
| *H04W 24/00* | (2009.01) |
| *H04W 4/00* | (2009.01) |
| *H04L 12/66* | (2006.01) |
| *G06Q 10/10* | (2012.01) |
| *G06Q 50/00* | (2012.01) |
| *H04L 29/06* | (2006.01) |
| *H04L 29/08* | (2006.01) |

(52) U.S. Cl.
CPC .............. *G06Q 10/107* (2013.01); *G06Q 50/01* (2013.01); *H04L 65/403* (2013.01); *H04L 67/00* (2013.01)

(58) Field of Classification Search
CPC . H04L 61/1529; H04L 61/1535; H04L 65/00; H04L 65/1006; H04L 41/5093; H04L 51/04; H04L 67/00; H04L 65/403; G06Q 10/107; G06Q 50/01

USPC .......... 709/205, 206, 207, 223, 204; 455/435.1, 456.1; 370/352
See application file for complete search history.

(56) References Cited

U.S. PATENT DOCUMENTS

| | | | | |
|---|---|---|---|---|
| 5,907,677 | A  * | 5/1999 | Glenn et al. ................. | 709/206 |
| 6,594,693 | B1 * | 7/2003 | Borwankar ................... | 709/219 |
| 6,647,272 | B1 * | 11/2003 | Asikainen .................... | 455/466 |
| 7,284,033 | B2 * | 10/2007 | Jhanji .......................... | 709/206 |
| 7,570,959 | B2 * | 8/2009 | Nurmi ....................... | 455/456.1 |
| 7,742,999 | B2 * | 6/2010 | Moran et al. ................ | 705/346 |
| 7,818,415 | B2 * | 10/2010 | Jhanji .......................... | 709/223 |
| 7,822,823 | B2 * | 10/2010 | Jhanji .......................... | 709/207 |
| 8,005,911 | B2 * | 8/2011 | Jhanji .......................... | 709/206 |
| 8,218,528 | B2 * | 7/2012 | Cai .............................. | 370/352 |
| 8,457,019 | B2 * | 6/2013 | Bonkowski et al. ......... | 370/260 |

(Continued)

OTHER PUBLICATIONS

"White Pine Announces 'CU-SEEME PRO Version 4.0' New Business Ready Desktop Videoconferencing Client," BusinessWire, Mar. 1, 1989; www.thefreelibrary.com/_/print/PrintArticle.aspx?id=53972270.

(Continued)

*Primary Examiner* — Viet Vu
*Assistant Examiner* — Michael A Chambers
(74) *Attorney, Agent, or Firm* — Larson Newman, LLP (57) ABSTRACT

A method includes determining a set of individuals available to participate in a chat event, and determining a pairing of individuals from the first set including a first individual and a second individual, the pairing based on matching criterion. The method also includes providing an invitation to the first individual and to the second individual, establishing communication between the first individual and the second individual in response to an acceptance of the first invitation by the first individual or in response to an acceptance of the first invitation by the second individual.

20 Claims, 8 Drawing Sheets

(56) References Cited

U.S. PATENT DOCUMENTS

| | | | |
|---|---|---|---|
| 8,510,392 B2* | 8/2013 | Ordille et al. | 709/206 |
| 8,804,697 B1* | 8/2014 | Capper et al. | 370/352 |
| 2003/0084335 A1* | 5/2003 | Moran et al. | 713/200 |
| 2003/0126250 A1* | 7/2003 | Jhanji | 709/223 |
| 2003/0158900 A1* | 8/2003 | Santos | 709/205 |
| 2004/0066919 A1* | 4/2004 | Seligmann | 379/88.13 |
| 2005/0288951 A1 | 12/2005 | Stone et al. | |
| 2006/0070003 A1* | 3/2006 | Thompson et al. | 715/758 |
| 2006/0117264 A1* | 6/2006 | Beaton et al. | 715/751 |
| 2006/0173785 A1 | 8/2006 | Behbehani | |
| 2007/0070940 A1* | 3/2007 | Vander Veen et al. | 370/328 |
| 2007/0192410 A1* | 8/2007 | Liversidge et al. | 709/204 |
| 2008/0059570 A1* | 3/2008 | Bill | 709/203 |
| 2008/0070697 A1* | 3/2008 | Robinson et al. | 463/42 |
| 2008/0072247 A1* | 3/2008 | Barnard | 725/32 |
| 2008/0091761 A1 | 4/2008 | Tsao | |
| 2008/0091786 A1* | 4/2008 | Jhanji | 709/206 |
| 2008/0170561 A1* | 7/2008 | Halbraich et al. | 370/352 |
| 2008/0244056 A1* | 10/2008 | Okamoto et al. | 709/223 |
| 2009/0005038 A1* | 1/2009 | Yasrebi et al. | 455/435.1 |
| 2009/0076889 A1* | 3/2009 | Jhanji | 705/10 |
| 2009/0077244 A1* | 3/2009 | Trang et al. | 709/228 |
| 2009/0089371 A1 | 4/2009 | Narang et al. | |
| 2009/0252308 A1* | 10/2009 | Arsenault et al. | 379/93.01 |
| 2010/0057858 A1* | 3/2010 | Shen et al. | 709/206 |
| 2010/0057859 A1* | 3/2010 | Shen et al. | 709/206 |
| 2011/0042453 A1* | 2/2011 | Jhanji | 235/375 |
| 2011/0131663 A1* | 6/2011 | Kaikuranta et al. | 726/28 |
| 2011/0317593 A1* | 12/2011 | Bonkowski et al. | 370/260 |
| 2012/0117164 A1* | 5/2012 | Bugayenko | 709/206 |
| 2014/0335822 A1* | 11/2014 | Jain | 455/407 |

OTHER PUBLICATIONS

"Changing the Face of Communication, 'CU-SEEME PRO' Desktop Video Collaboration Software," Product Brochure ftp://ftp.wintel.fi/docs/CUseeMe/cupro.pdf, Year: 1999.

\* cited by examiner

| RELATIONSHIP BETWEEN PROSPECTIVE CHAT PARTICIPANTS | WEIGHTING FACTOR |
|---|---|
| Same Group | 0.9 |
| Same Project | 0.8 |
| Same Division | 0.7 |
| Same Building | 0.6 |
| Same Geographical Location | 0.5 |
| Degree of Separation on Organizational Chart | 0.4 |
| Most Recent Chat with The Other Participant | 0.3 |
| Most Recent Chat with Any Other Participant | 0.4 |
| Either Participant Has The Other Participant on 'Favor' | 1.0 |
| Either Participant Has The Other Participant on 'Ignore' | 0.0 |
| "Door Is Open" | 1.0 |
| Customer | 1.0 |
| Sales | 1.0 |
| Manager | 1.0 |

METHOD FOR ESTABLISHING INTERPERSONAL COMMUNICATION AND SYSTEM

FIELD OF THE DISCLOSURE

This disclosure generally relates to information handling systems, and more particularly relates to a system and a method for establishing interpersonal communication using information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer technology today provides the foundation for nearly every aspect of business activity and is equally ubiquitous in our personal and social lives. Information handling systems and associated software applications have greatly increased worker productivity and have provided businesses and organizations with altogether new capabilities and opportunities. On a seemingly daily basis, breakthroughs in computer technology continue to reshape business, society, and our personal lives.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
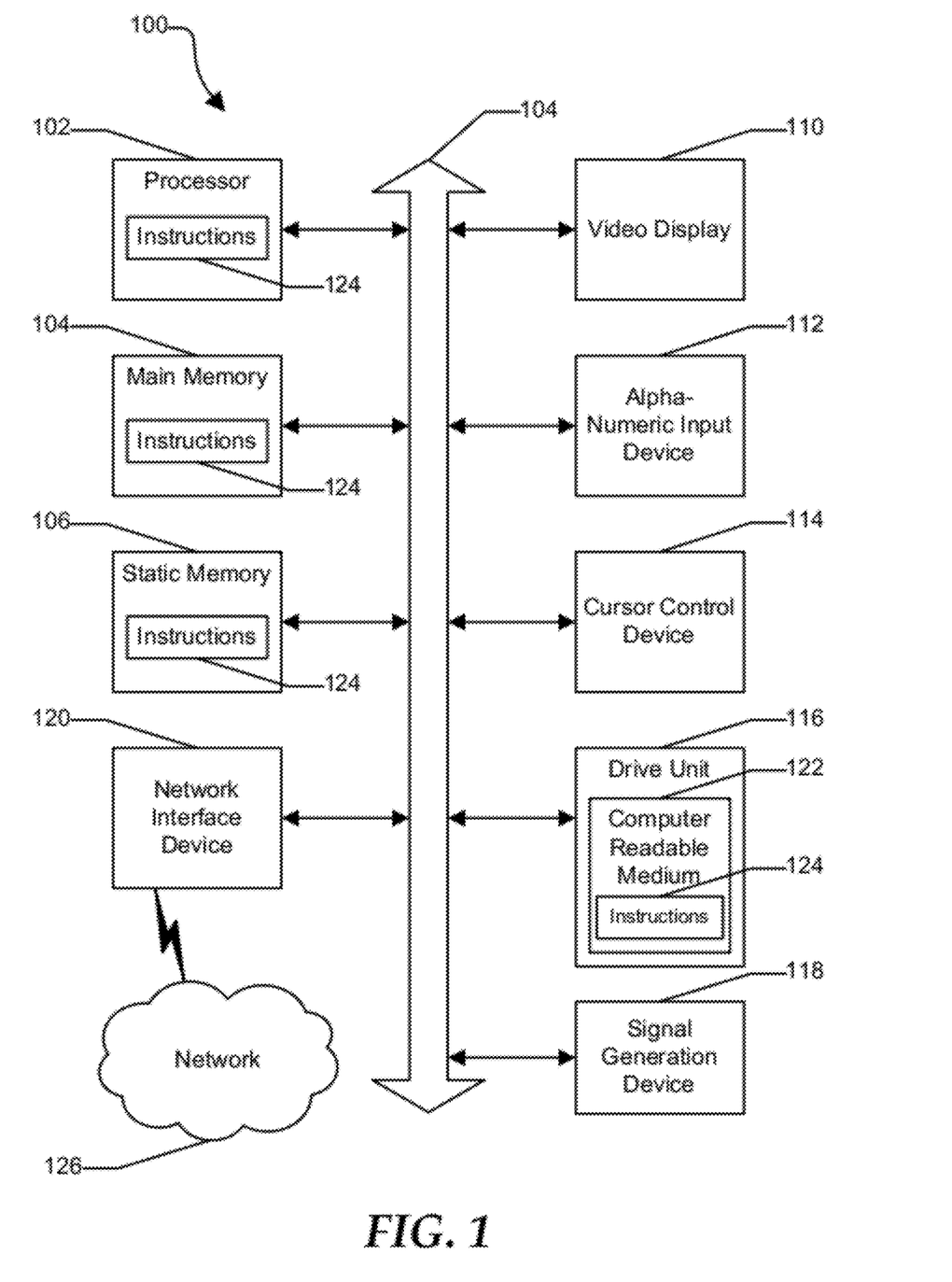
FIG. 1 is a block diagram illustrating an information handling system capable of administering each of the specific embodiments of the present disclosure.

FIG. 1 shows an information handling system 100 capable of administering each of the specific embodiments of the present disclosure. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device 114, such as a mouse. The information handling system 100 can also include a disk drive unit 116, a signal generation device 118, such as a speaker or remote control, and a network interface device 120. The information handling system 100 can represent a server device whose resources can be shared by multiple client devices, or it can represent an individual client device, such as a desktop personal computer. In an embodiment of the present disclosure, an interpersonal communication system can be implemented using one or more server devices and multiple client devices.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a CPU or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Computer technology is present in nearly every facet of our lives. This is particularly true in a business environment where information handling systems such as the information handling system 100 can be used to automate manufacturing processes, to store, manipulate, and transfer information, to facilitate human communication, and more. For example, multiple information handling systems can be interconnected via a variety of communication networks to implement electronic mail services, browser based internet services, video conferencing, voice telephony services, and the like. Interpersonal communications, such as between business associates or between members of an organization, can be vital for maintaining a productive operating environment. This is especially true as the size of a business or organization grows, and particularly so when parties are located remotely from one another. For example, today an organization may have individual facilities all over the world, yet there remains a need to interoperate efficiently. In addition to increasing worker productivity, quality interpersonal communications can improve morale and stimulate respectful community behavior. Unfortunately, such interaction can be quite difficult to establish in many situations.

Techniques disclosed herein can be used to facilitate interpersonal communications between employees at a business, members of an organization, or a network of friends. For example, systems and methods disclosed can be implemented to promote human interaction that emulates "hall way" encounters and fosters natural community behavior. While these techniques can be applied equally to any organization of individuals, for simplicity they are described in the context of a business and employees. In addition, for simplicity the term "chat" is used herein to represent an interpersonal communication event. In an embodiment, a chat server can maintain a list of employees who are presently available to participate in a chat with another employee; determine one or more pairings of the available employees based on matching criteria; provide each individual of a particular pairing with an invitation to chat with the corresponding individual; and facilitate a chat between any pair of individuals based on acceptance of the invitation by either party. In an embodiment, individual employees or a business administrator can configure matching criteria to determine preferred pairings of available employees. For example, weighting factors can be assigned to potential chat partners based on a degree of separation between prospective employees on an organization chart, job function, and the like. The availability of potential chat participants can be determined based on a variety of criteria including determining their physical presence at a work station. In addition, automated systems can identify whether an employee is currently busy with a telephone call, actively using a keyboard or other machinery, has an appointment scheduled by an office automation calendar program, and the like. The term work station is used herein to refer to a location at which an employee typically performs their work duties, such as an office, cubical, desk, post, an assigned location, and the like.

Figure 2:
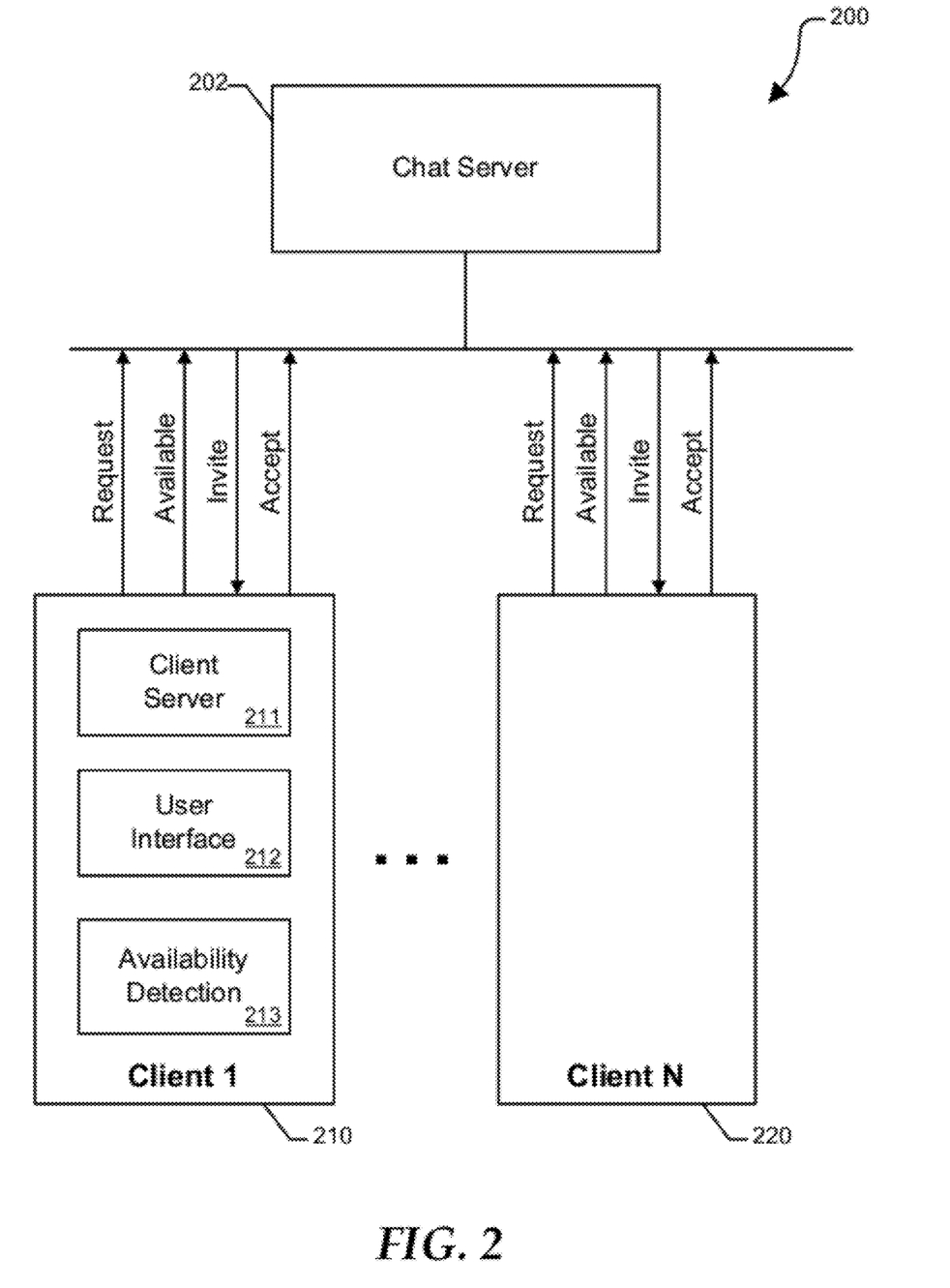
FIG. 2 is a block diagram illustrating an implementation of a chat system in accordance with a specific embodiment of the present disclosure.

FIG. 2 shows an implementation of a chat system 200 in accordance with a specific embodiment of the present disclosure. The chat system 200 includes a chat server 202 and multiple chat clients, including a client 210 and a client 220. Each chat client includes a client server 211, a user interface 212, and an availability detection module 213. The chat server 202 can include a software process that is actively executing at an information handling system, such as the information handling system 100 of FIG. 1. In an embodiment, the chat server 202 can operate substantially continuously, monitoring the status of each chat client. Each chat client, including the chat clients 210 and 220, is typically associated with a corresponding employee, and can include another software process that is actively executing at an information handling system associated with an employee, such as a desk top personal computer.

The chat server 202 is configured to administer chat services by maintaining a list of employees who are participating and are presently available to engage in a chat with another employee and soliciting pairs of individuals to chat, the pairing based on one or more criterion. The chat server can communicate with each chat client using any type of interconnect or network and a suitable communications protocol. For example, the chat server can communicate with each client via an Ethernet network, a wireless network, a telephone network, and the like. Chat clients 210 and 220 also can initiate communication with the chat server 202. For example, the user interface 212 can display a graphical button or icon at a video display unit connected to the employee's desk top computer, and an employee can issue a request to participate in the chat service by using a mouse or other pointing device to select the button. In response, the client server 211 can forward the employee's request to participate to the chat server 202, indicated by the signal REQUEST at FIG. 2. The availability detection module 213 at each chat client can proceed to keep the chat server 202 informed of the employee's presence and availability to participate in a chat with another individual, indicated by the signal AVAILABLE at FIG. 2. The chat server 202 substantially continuously monitors the availability of each participant and can determine preferred pairings of individuals based on one or more matching criteria. Having determined at least one suitable pairing, the chat server 202 can invite each individual to participate in a chat with one another, indicated by the signal INVITE at FIG. 2. An employee can accept an invitation to chat with a particular individual using the user interface 212, and the client server 211 can notify the chat server 202 of this event using the signal ACCEPT.

Figure 3:
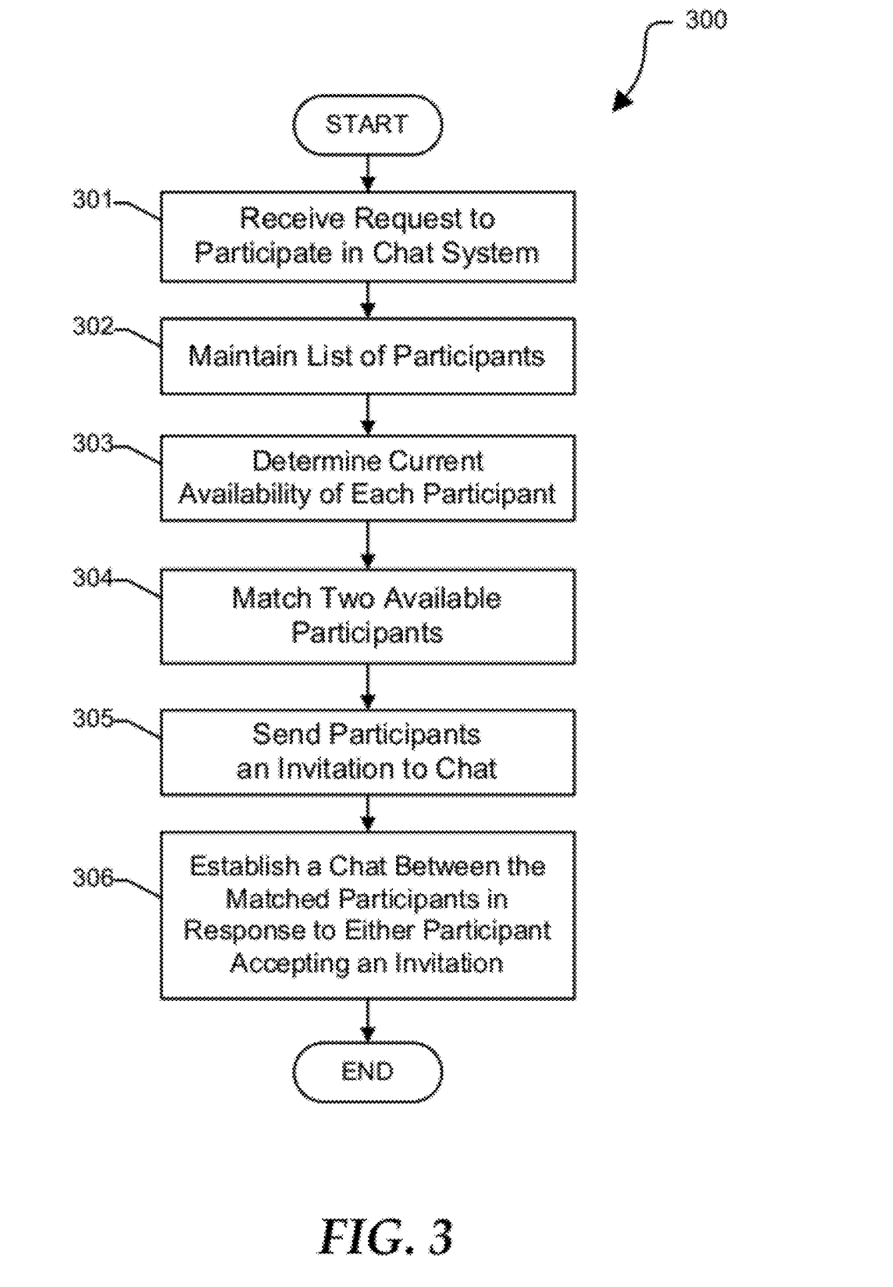
FIG. 3 is a flow diagram illustrating a method for establishing interpersonal communication in accordance with a specific embodiment of the present disclosure.

The operation of the chat system 200 can be better understood with reference to the flow diagram 300 illustrated at FIG. 3. Flow diagram 300 shows a method for establishing interpersonal communication in accordance with a specific embodiment of the present disclosure. The method begins at block 301 where a request to participate in a chat system is received at a chat server from an employee. For example, employees associated with each of the chat clients 210 and 220 can inform the chat server 202 that they would like to participate in the chat system by asserting their respective REQUEST signal. The flow proceeds to block 302 where the chat server 202 can maintain a list of employees that have requested participation. The flow proceeds to block 303 where the chat server 202 determines the current availability of each participant. For example, multiple employees may desire to participate in the chat service. Throughout a work day, at any particular moment individual employees may be busy or otherwise unable to participate in a chat. The availability detection module 213 at each chat client can keep the chat server 202 informed as to the presence and availability of each participating employee using their respective AVAILABLE signal.

The flow proceeds to block 304 where the chat server 202 can match two available participants, the preferred pairings based on matching criteria stored at the chat server 202. For example, if two available employees work on the same project, knowledge of this mutual relationship can determine that the two employees are better candidates for engaging in a mutual chat than are two available employees that do not have a close working relationship. Furthermore, ideal candidates for a chat may well include employees whose mutual work is related, but who are geographically isolated from one another. Accordingly, the chat server 202 can determine pairings of participants based on multiple matching criteria. Each criterion can be associated with a weighting factor to allow the chat server to determine preferred pairing of individuals for participation in a chat. Furthermore, the chat server 202 can determine more than one match. For example, the chat server 202 can identify the four best matches based on the matching criteria and optional weighting factors. Matching criteria weighting can be specified by the client server 211 based on an employee's preferences, by the chat server 202 based on employee management preferences, or a combination of employee and employer preferences.

The flow proceeds to block 305 where, having determined a pairing of two employees, the chat server 202 sends each of the matched participants an invitation to chat. For example, if two employees, Tom and Sally, are each available to chat and are paired based on matching criteria, an invitation to chat with Sally can be sent to Tom, while an invitation to chat with Tom can be sent to Sally. In an embodiment, an invitation to chat may be in the form of a small photographic icon of the corresponding chat member appearing in a chat interface window rendered on a corresponding video display unit of each respective chat member. The flow proceeds to block 306 where, in response to either of the matched participants accepting the chat invitation, the chat server establishes a chat between the paired individuals. For example, in one embodiment, a chat dialog box may appear in response to acceptance by either party, wherein the individuals can carry on a conversation using text using a computer keyboard. In another embodiment, each respective chat client may initiate a voice-enabled chat service. In still other embodiments, a chat may be implemented using a telephone system, a video conferencing system, and the like. If feasible and desired, chat participants may choose to rendezvous at a conference room or the like for a face-to-face chat. For example, the chat server 202 can access a reservation system to identify an unoccupied conference room and optionally reserve the room on the participant's behalf. During the time that a chat is underway, participants in the chat are classified as unavailable, and the chat server 202 does not provide either participant with another chat invitation until the current chat has completed. In another embodiment, the chat server 202 can establish a chat between paired individuals based only on determining a pairing, without first sending invitations to the paired individuals.

Figure 4:
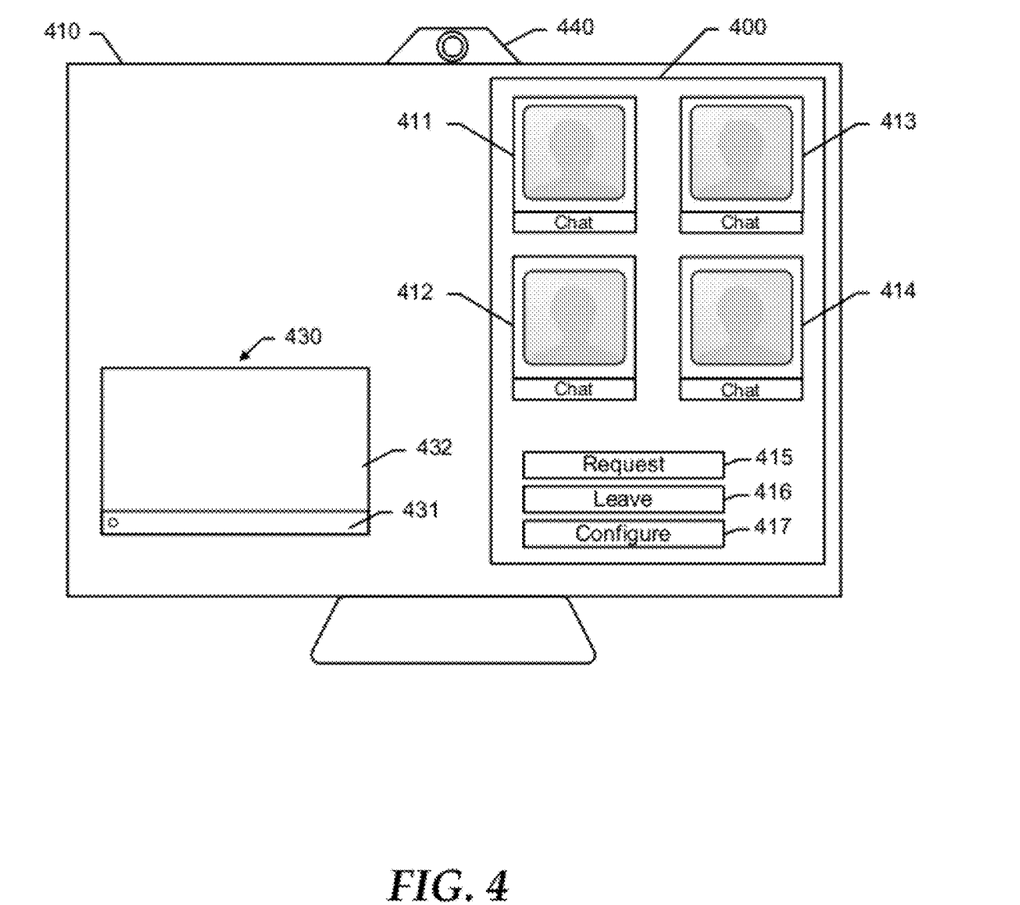
FIG. 4 illustrates a user interface associated with the chat system of FIG. 2 in accordance with a specific embodiment of the present disclosure.

FIG. 4 shows a video display device and a user interface 400 associated with the chat system in accordance with a specific embodiment of the present disclosure. The user interface 400 can be displayed at a display device 410 such as the video display unit 110 of FIG. 1. The user interface 400 can display one or more icons, each icon representing an invitation to participate in a chat with a respective individual, the identity of each individual conveyed by the respective icon. For example, the user interface 400 includes four invitation icons 411, 412, 413, and 414 representing four individuals that are presently available to participate in a chat. An employee can select one of the icons by clicking on the icon corresponding to the individual with whom the employee would like to chat. In an embodiment, each icon can include a photograph of the respective individual. In other embodiments, an icon can include a video image, an avatar, a simple text name, or another graphical or text object identifying the prospective chat participant. The user interface 400 includes a REQUEST button 415, a LEAVE button 416, and a CONFIGURE button 417. An employee can notify a chat server such as the chat server 202 of FIG. 2 that they would like to participate in the chat system by clicking the REQUEST button. The employee can withdraw their request to participate by clicking the LEAVE button.

The CONFIGURE button 417 provides access to one or more menus through which the employee can control various chat system options, preferences and the like. A configuration menu can provide a means to apply weighting factors to matching criteria, thereby notifying the chat server of any preferences the employee may have regarding potential chat partners. For example, an employee may indicate that they only want to chat with other individuals who are associated with their own work group. Techniques for assigning weights to various matching criteria are described below with reference to FIG. 7.

A client server, such as the client server 211 of FIG. 2, can provide and monitor the user interface 400. The client server 211 can respond to actions initiated by an employee via the user interface 400, and can send and receive information from the client server 202 and update the user interface 400 accordingly. In an embodiment, the client server 211 can activate or otherwise render a chat window 430 at the video display unit associated with both participants in response to an acceptance of a chat invitation by either member of a matched pair of participants. In an embodiment, the chat window can include a text entry window 431 for entering a text message and a scrolling chat log window 432 for displaying a conversation. The chat window 430 represents only one of any number of mechanisms through which a chat can commence. For example, in response to an acceptance to chat by either party of a matched pair, the chat server 202 can establish a telephone connection between the chat participants. One skilled in the art will appreciate that a user interface for accessing and operating the chat system disclosed herein can be implemented in many different ways without departing from the scope of the present disclosure. For example, in an embodiment a chat system user interface can be provided at a cellular telephone, a notebook computer, a personal digital assistant (PDA), or another type of information handling system. In another embodiment, the client server 211 and associated modules can be incorporated within a telephone apparatus, with or without video display capabilities.

A video display unit can include a camera, such as the camera 440 of FIG. 4, that is configured to periodically take a photograph of the employee working at the corresponding work station. The client server 211 can provide the photograph to the chat server 202, which can use the photograph to create invitation icons displayed at the user interface of potential chat partners. In embodiment, the photograph can be taken in response to an explicit command issued by a user. In another embodiment, the client server can utilize the camera 440 to determine if the employee associated with the particular work station is currently present. In still another embodiment, the client server 211 can utilize face recognition software to confirm that the person sitting at the work state is in fact the person identified as a potential chat participant. In yet another embodiment, the camera 440 can include a video camera and the icon and chat window 430 can include a live video image of their chat partner.

Figure 5:
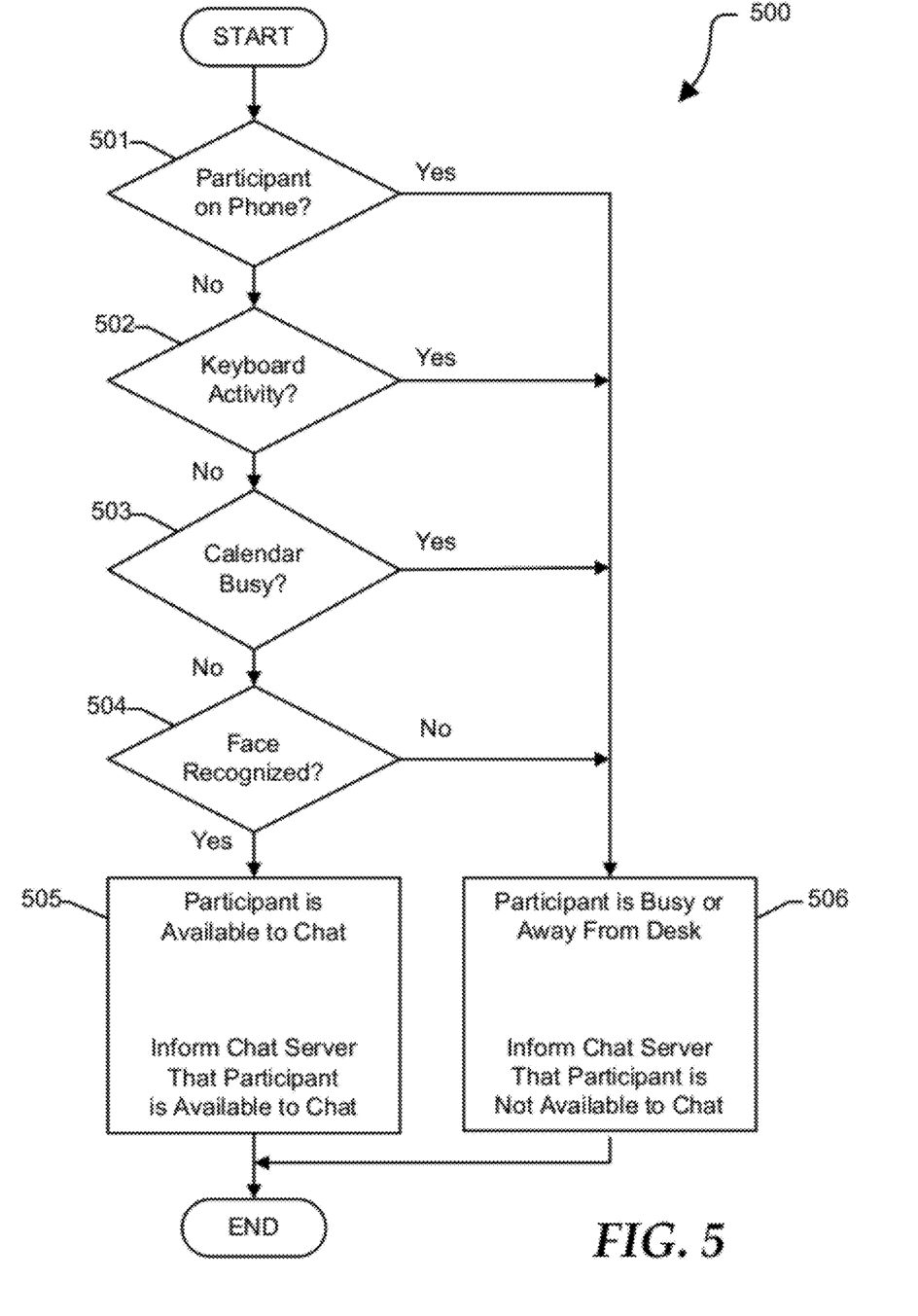
FIG. 5 is a flow diagram illustrating a method for determining whether an individual is available to participate in a chat in accordance with a specific embodiment of the present disclosure.

FIG. 5 shows a method 500 for determining whether an employee is available to participate in a chat in accordance with a specific embodiment of the present disclosure. Method 500 can be performed by an availability module such as the availability detection module 213 of FIG. 2 in association with the client server 211. The method 500 begins at block 501 where the availability module 213 determines whether a prospective chat participant is currently using a telephone. If not, the flow proceeds to block 502 where the availability module 213 monitors the employee's keyboard to determine if the employee is actively typing. If no keyboard activity is detected, the flow proceeds to block 503 where the availability module 213 can access an office automation system to determine if the employee is currently scheduled to attend a meeting or another event. If the employee's calendar is clear, the availability module 213 can acquire a photograph and utilize a face recognition program to determine if the intended employee that is participating in the chat system is in fact sitting at the work station. If the face recognition software identifies that the correct employee is present, the flow proceeds to block 505 where the client server 211 can notify the chat server 202 that the participant is available and can therefore receive invitation to chat. If however at blocks 501-504 the availability module 213 determines that the intended employee is either not present or is otherwise busy, the flow proceeds to block 506 where the client server 211 notifies the chat server 202 that the participant is not currently available to participate in a chat.

The method 500 illustrates only a few of many techniques by which the availability module 213 can determine the presence and availability of an employee who has previously indicated a desire to participate in the chat service. One skilled in the art will appreciate that the availability module 213 can use many other techniques to determine the status, presence, and availability of a participant. For example, a proximity detection module can be associated with the employee's work station or with a corresponding information handling system, wherein the proximity detection module is configured to detect the presence of an individual. In a specific embodiment, the proximity detection module can include a radio frequency identification device (RFID) receiver configured to determine whether an RFID corresponding to a specific employee is detected within the immediate work area. In other embodiments, the availability module can detect the presence of the user's cell phone, PDA, pager, or another personal electronic device within the proximate area.

Figure 6:
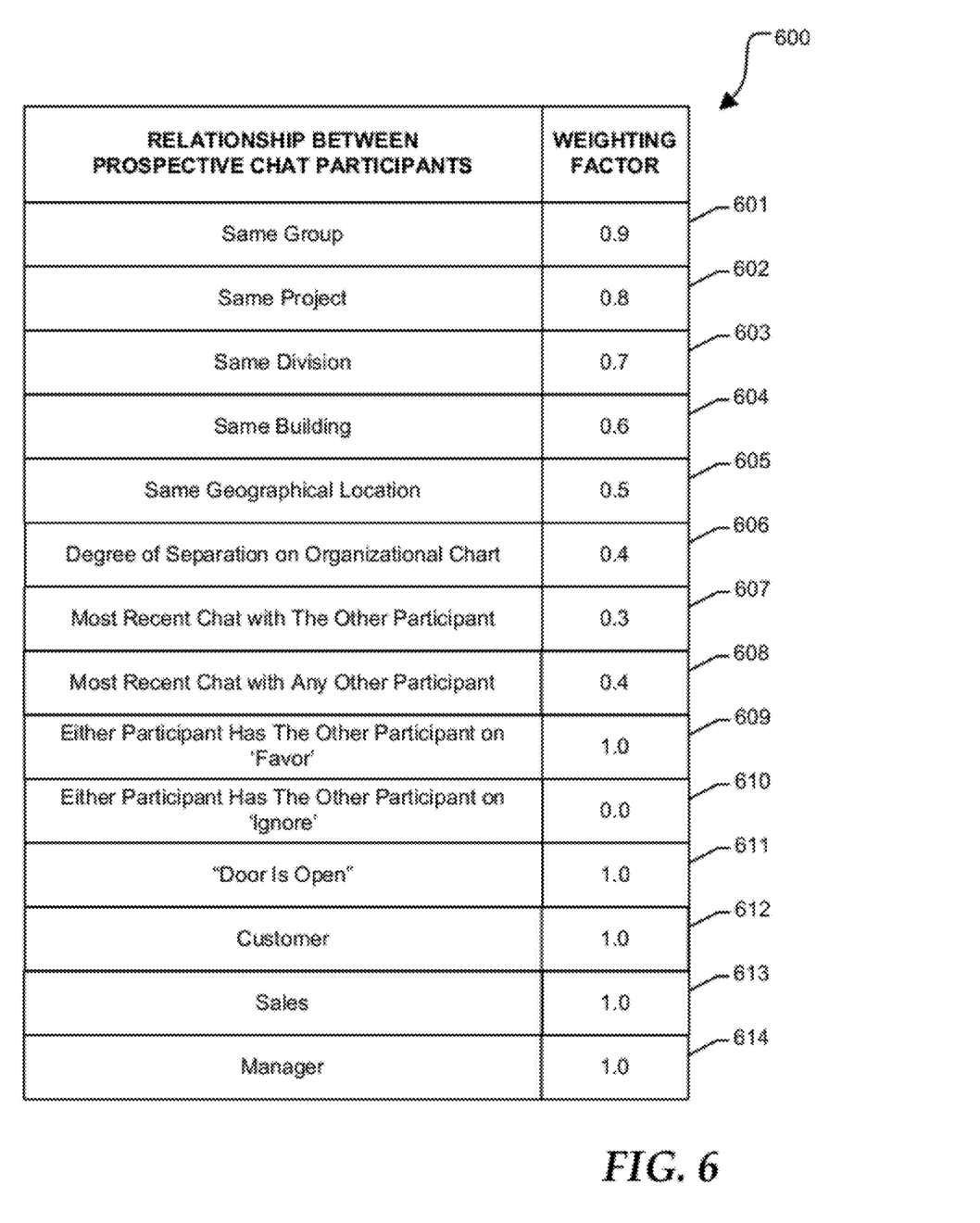
FIG. 6 is a table illustrating matching criteria with corresponding weighting factors for selecting chat partners in accordance with a specific embodiment of the present disclosure.

FIG. 6 shows a table 600 illustrating matching criteria and corresponding weighting factors that can be used to select potential chat partners in accordance with a specific embodiment of the present disclosure. A chat server can determine optimal pairings of individuals using the information provided by the table 600. For example, the chat server 202 can use priority information included at the table 600 to select and invite two employees to engage in a chat. The table 600 can represent configuration information maintained at a chat server such as the chat server 202 of FIG. 2. In an embodiment, the configuration information may represent policies instituted by company management. In another embodiment, the configuration information may represent preferences of individual users of the chat system 200. In still another embodiment, the configuration information may include a combination of management and user information. For example, management may provide particular configuration information to enforce specific system characteristics while permitting individual users to refine other configuration information based on personal preferences. The chat system 200 can include a graphical or text based interface through which business management personnel can specify matching criteria and corresponding weighting factors and other configuration information. In addition, individual users of the chat system 200 can utilize the user interface 212 and associated configuration menus to modify existing configuration information or to specify other matching criteria and weighting factors.

The table 600 includes a first column identifying various matching criteria. In particular, the matching criteria illustrated at the table 600 relate to a mutual relationship between prospective chat participants. The table 600 includes a second column wherein a user of the chat system can supply weighting factors associated with each corresponding matching criterion. The weighting factors can include numerical values wherein a higher value increases the likelihood that two individuals having the associated relationship will be selected to chat with one another. In an embodiment, multiple applicable weighting factors can be summed together. In another embodiment, the highest weighting factor of any applicable weighting factors can be used exclusively to select a pairing. Another method for establishing a priority for matching individuals to participate in a chat can be implemented without departing from the scope of the present disclosure. For example, weighting factors can include the attributes high, medium, and low. In another embodiment, weighting factors are not included at the table 600 and the order that the matching criteria appear in the table determines a corresponding priority of each criterion.

The table 600 includes rows 601-615 wherein each row is associated with a corresponding matching criteria and a respective weighting factor. The row 601 includes a matching criterion "same group" and a corresponding weighting factor value of "0.9." If a chat server determines that two employees who are working within the same work group are both available to chat, the associated weighting factor of 0.9 can designate to the chat server that these two individuals are preferred candidates for being paired for a potential chat. The row 602 includes a matching criterion "same project" and a corresponding weighting factor value of "0.8." Because the weighting factor associated with an individual working on the same project is less than that of someone working within the same group, in the event that individuals matching both criteria are available to chat, the chat server 202 can select the individuals that are from the same group to participate in a chat. Similarly, the row 603 includes a matching criterion "same division" and a corresponding weighting factor of "0.7" to indicate that two individuals from the same division of the company can be selected to chat only after selecting available individuals from the same group or project, if such people are available to chat.

As described above, the chat server 202 can provide multiple solicitations to a particular employee. The chat server 202 can determine who receives particular invitations based on the weighting factors included at the table 600 and the individual employees can select from amongst those invitations the particular invitation that they would like to accept. The table 600 includes additional matching criteria and corresponding weightings such as "same building" 604, "same geographical location" 605, "degree of separation on an organizational chart" 606, "most recent chat with the other participant" 607, "most recent chat with any other participant" 608, "either participant has the other participant on favor" 609, "either participant has the other participant on ignore" 610, "door is open" 611, either party is a "customer" 612, either party is associated with "sales" 613, and either party is a "manager" 614. For example, the chat server 202 can be configured to avoid matching participants who have chatted with each other recently, or who have chatted with someone else recently. For another example, a participant who has some free time may configure the chat server to increase the number of chat invitations that they receive by setting a weighting factor corresponding to the criterion "door is open" to a value of 1.0.

The matching criteria and weighting factors illustrated at the table 600 are only examples of possible criteria and weightings to illustrate the operation of the chat server 202. For example, matching criteria can be selected based on particular user or administrator preferences, or they can be selected based on the specific type of business or organizational structure. In one embodiment, the matching criterion can be random. In another embodiment, the matching criteria can be configured to foster communication between individuals that are not likely to engage in dialog on a regular basis, such as individuals from disparate departments. In yet another embodiment, a participant can specifically request a chat with another person when that person becomes available, or when the chat server determines that both parties are available. Furthermore, a request by one party to chat with another party can be identified as "urgent," wherein an associated invitation is annotated accordingly. For example, icons appearing in a user interface can be colored red to indicate that an invitation should preferably be accepted immediately. Thus, a company can establish chat policies and use the table 600 or another configuration protocol define those policies to encourage or enforce a desired amount of interpersonal communications.

Figure 7:
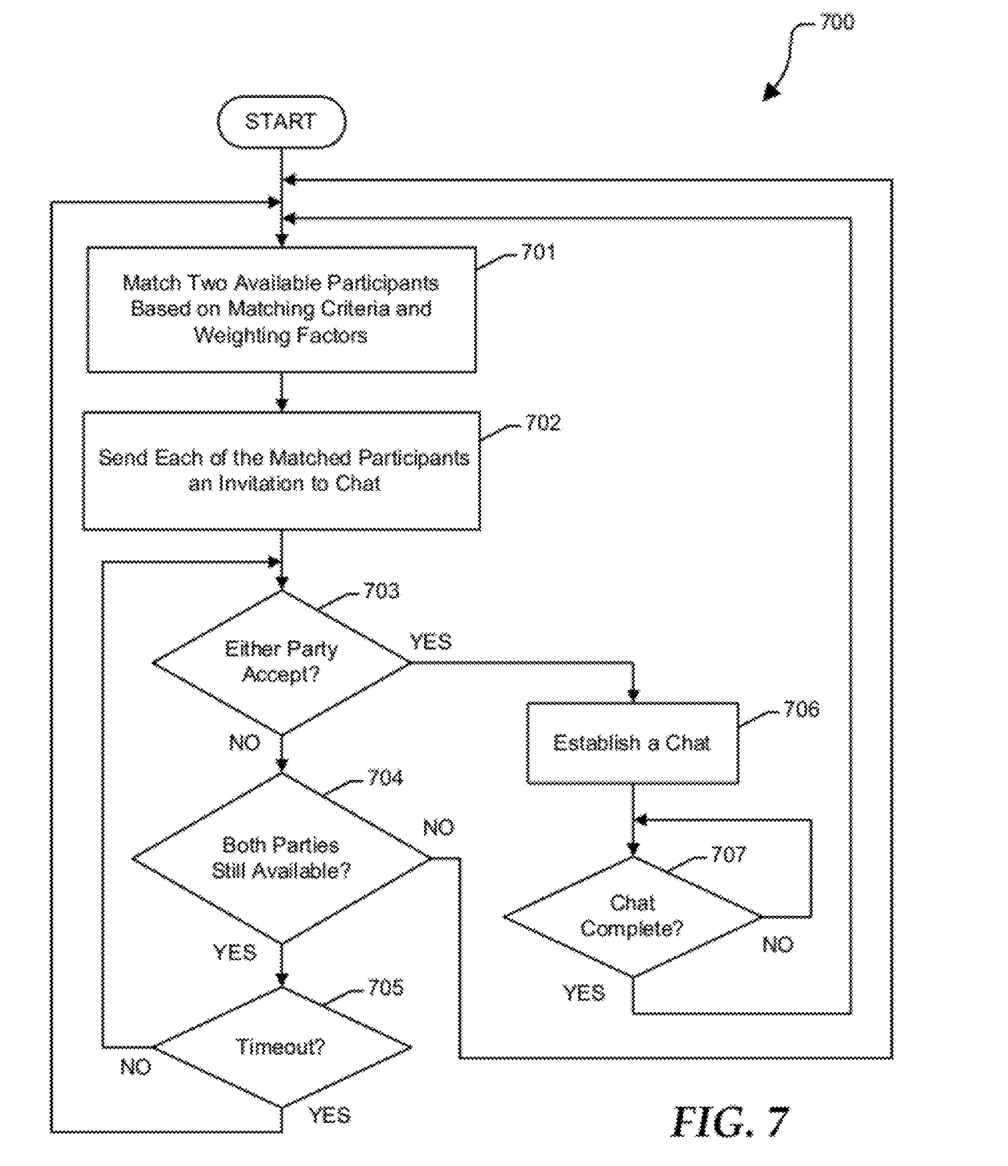
FIG. 7 is a flow diagram illustrating the operation of the chat server of FIG. 2 in accordance with a specific embodiment of the present disclosure.

FIG. 7 shows a method 700 for operating the chat server of FIG. 2 in accordance with a specific embodiment of the present disclosure. The method 700 provides further details corresponding to the blocks 304-306 of FIG. 3. The method 700 begins at block 701 where a chat server, such as the chat server 202 of FIG. 2, matches two available participants based on matching criteria and associated weighting factors. For example, having established a list of employees who have requested participation in the chat system, and further, having identified a portion of those individuals who are available to participate in a chat at the present time, the chat server 202 can utilize various matching criteria such as the table 600 to select two individuals to invite to chat with one another. The flow proceeds to block 702 where the chat server sends each of the matched participants an invitation to chat. For example, the chat server 202 can transmit invite information to a client server associated with each of the matched participants. Each client server can notify a respective participant of the invitation using the user interface 400, such as by displaying a photograph of the other party at a video display unit corresponding to each party.

The flow proceeds to decision block 703 where the chat server determines whether either party of a pair of matched and invited individuals has accepted the invitation to chat. If either party accepts the invitation, the flow proceeds to block 706 where the chat server facilitates the establishment of a chat between the matched parties. As described above, the chat can commence using any of a variety of communication media including chat windows spawned at corresponding video display units of each party by respective client servers, orchestrated by the chat server 202. The flow proceeds to decision block 707 wherein the client server 211 associated with each party and the chat server 202 determine that an established chat has completed. Having completed the chat, each party is potentially available to participate in another chat based on their respective availability and based on matching criteria. Returning to decision block 703, if the invitation to chat has yet to be accepted, the flow proceeds to block 704 where the chat server 202 can confirm that both parties are still available to chat. If at any time, either party becomes unavailable, the chat server revokes the invitation to chat from both parties. If both parties remain available, the flow proceeds to decision block 705 where the chat server 202 can determine whether the invitation to chat has remained unanswered for longer than a predetermined amount of time. If a timeout period has expired, the chat server revokes the invitation to chat from both parties. Otherwise, the flow returns to decision block 703, further awaiting acceptance by either party.

The chat server and client servers can perform many of the preceding functions in a parallel manner. For example, decision blocks 703, 704, and 705 can monitor acceptance, availability, and timeout substantially simultaneously. Furthermore, the method 700 can be performed substantially simultaneously for multiple chat invitations presented to each of multiple participants. For example, a chat server can monitor the availability of each participant, provide each participant with one or more chat invitations based on a mutual relationship between the participants and matching criteria, and continuously monitor each participant to determine if an invitation has been accepted or to determine if an outstanding invitation has remained unanswered for an excessive amount of time.

Figure 8:
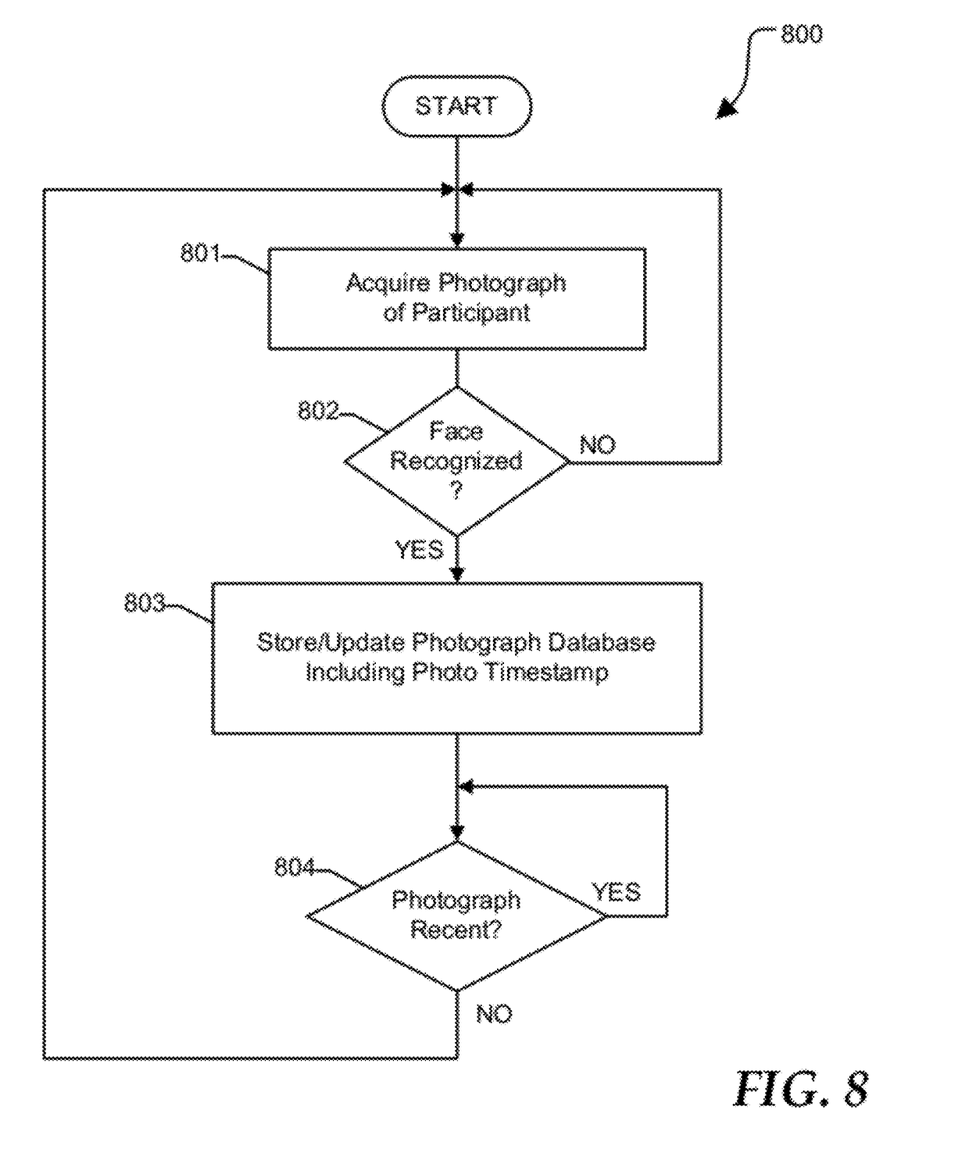
FIG. 8 is a flow diagram illustrating a method for acquiring a photograph of an individual for use by a chat system in accordance with a specific embodiment of the present disclosure.

FIG. 8 shows a method 800 for acquiring a photograph of an individual for use by a chat system in accordance with a specific embodiment of the present disclosure. The photograph of one party can be used to provide an invitation icon to be displayed at a user interface of another party, and can be used to determine the presence of a participant at their respective work station. The method can be implemented by either a chat server, such as the chat server 202 of FIG. 2, or by a client server such as the client server 211. The method 800 begins at block 801 where a camera located in proximity to a participant takes a photograph. For example, the camera 430 located at the participants video display unit, and directed towards an operator at the work station, can acquire a photograph in response to a request by the chat server 202, a request by the client server 211, or an action performed by a participant situated at the work station. The flow proceeds to decision block 802 where a face recognition utility determines whether the photograph identifies the intended chat participant. If the face recognition utility does not identify the participant (or if no one is present in the photograph), the flow returns to block 801 where a subsequent photograph can be acquired. If the face recognition utility confirms the presence of the correct individual, or if the photograph captured at block 801 represents an initial photograph of an employee, the flow proceeds to block 803 where the photograph is stored at a database along with a timestamp identifying the time at which the photograph was acquired. In an embodiment, acquisition of an initial photograph or of an updated photograph of an employee at block 801 can be submitted to the photograph database accompanied by suitable credentials or other information to verify the identity of the employee. The flow proceeds to decision block 804 where it is determined whether a predefined amount of time has passed since a photograph has been acquired. If a new photograph is needed, the flow returns to block 801. The method 800 can be performed independently at each participant's work station and can be performed independently of other processes underway within the chat system.

Referring back to FIG. 1, the information handling system 100 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   identifying at a computer a plurality of individuals who are candidates to participate in an interpersonal communication event with one other unspecified individual of the plurality of individuals, the event initiated by the server at an unscheduled time;
   determining at the computer a subset of the plurality of individuals currently available at a first time to participate in a first interpersonal communication event;
   determining at the computer a first pairing of individuals from the subset including a first individual and a second individual, the first pairing based on a first matching criterion and pursuant to identifying exactly two individuals;
   in response to determining the first pairing, providing by the computer, a first invitation to the first individual and to the second individual, the first invitation to participate in the first interpersonal communication event, the first invitation not solicited by the first or the second individual;
   establishing, by the computer, communication between the first individual and the second individual in response to an acceptance of the first invitation by the first individual or in response to an acceptance of the first invitation by the second individual; and revoking the first invitation in response to determining that the first individual or the second individual are no longer available to participate.

2. The method of claim 1 further comprising revoking the first invitation in response to determining that the first invitation has remained unanswered for longer than a predetermined amount of time.

3. The method of claim 1 further comprising:
updating the subset of individuals available to participate at a second time;
determining a second pairing of individuals from the updated subset including a third individual and a fourth individual;
in response to determining the second pairing, providing a second invitation to the third individual and to the fourth individual, the invitation to participate immediately in a second interpersonal communication event; and
establishing communication between the third individual and the fourth individual in response to an acceptance of the second invitation by the third individual or in response to an acceptance of the second invitation by the fourth individual.

4. The method of claim 1 wherein the first interpersonal communication event comprises exchanging messages using a text based user interface rendered at a video display unit at an information handling system associated with the first individual and a similar user interface rendered at a video display unit at an information handling system associated with the second individual.

5. The method of claim 1 wherein the first interpersonal communication event is implemented using an electronic voice communication system.

6. The method of claim 1 wherein the first invitation includes displaying an icon identifying the first individual at a video display unit associated with the second individual and displaying an icon identifying the second individual at a video display unit associated with the first individual.

7. The method of claim 6 wherein the icon identifying the first individual is a photograph of the first individual.

8. The method of claim 1 wherein determining the set of individuals available at the first time comprises determining the presence of the first individual at a predetermined location.

9. The method of claim 1 wherein determining the set of individuals available at the first time comprises accessing an appointment system.

10. The method of claim 1 wherein the first matching criterion is configurable.

11. The method of claim 1 wherein the first matching criterion is a working relationship between the first individual and the second individual.

12. A method comprising:
providing at a first time an indication to an interpersonal communication event server as to current availability of a first individual to participate in an interpersonal communication event, the providing initiated by an information handling system associated with the first individual and without action by the first individual;
receiving at the information handling system a first invitation from the interpersonal communication event server, the invitation soliciting the first individual to participate in a first interpersonal communication event with only a second individual, the second individual selected from a subset of the plurality of willing individuals available at the first time to participate in an interpersonal communication event, the event initiated by the interpersonal communication event server, the selection by the interpersonal communication event server based on a first matching criterion;
initiating, by the interpersonal communication even server, the first interpersonal communication event between the first and the second individual in response to an acceptance of the first invitation by the first individual or in response to an acceptance of the first invitation by the second individual; and
receiving an indication from the interpersonal communication event server that the first invitation is revoked in response to determining at the event server that the first individual or the second individual are no longer available to participate.

13. The method of claim 12 further comprising receiving at a second time a revocation of the first invitation in response to determining at the interpersonal communication server that the first invitation has remained unanswered for longer than a predetermined amount of time.

14. The method of claim 12 wherein providing the indication comprises:
determining, at a client server process executing at an information handling system, the presence and availability of the first individual at the first time; and
transmitting the indication to the interpersonal communication event server.

15. The method of claim 12 further comprising providing an indication to the interpersonal communication event server as to the availability of the first individual to participate in the interpersonal communication event at a second time.

16. The method of claim 12 wherein the first matching criterion is a working relationship between the first individual and the second individual.

17. An information handling system comprising:
a processor; and
a storage medium, the storage medium comprising instructions executable by the processor to:
identify a plurality of individuals who are candidates to participate in an interpersonal communication event with one other unspecified individual of the plurality of individuals, the event initiated by the information handling system at an unscheduled time;
determine a subset of the plurality of individuals currently available at a first time to participate in a first interpersonal communication event;
determine a first pairing of individuals from the subset including a first individual and a second individual, the first pairing based on a first matching criterion and pursuant to identifying exactly two individuals;
in response to determining the first pairing, provide a first invitation to the first individual and to the second individual, the first invitation to participate in the first interpersonal communication event, the first invitation not solicited by the first or the second individual;
establish communication between the first individual and the second individual in response to an acceptance of the first invitation by the first individual or in response to an acceptance of the first invitation by the second individual; and
revoke the first invitation in response to determining that the first individual or the second individual are no longer available to participate.

18. The system of claim 17 wherein the instructions executable by the processor are further to revoke the first invitation in response to determining the first individual that the first invitation has remained unanswered for longer than a predetermined amount of time.

19. The system of claim 17 wherein the first invitation includes displaying an icon identifying the first individual at a video display unit associated with the second individual and displaying an icon identifying the second individual at a video display unit associated with the first individual.

20. The system of claim 17 further comprising instructions to:
- update the subset of individuals available to participate at a second time;
- determine a second pairing of individuals from the updated subset including a third individual and a fourth individual;
- in response to determining the second pairing, provide a second invitation to the third individual and to the fourth individual, the invitation to participate immediately in a second interpersonal communication event; and
- establish communication between the third individual and the fourth individual in response to an acceptance of the second invitation by the third individual or in response to an acceptance of the second invitation by the fourth individual.

* * * * *